(12) United States Patent
Nojima et al.

(10) Patent No.: US 6,395,665 B2
(45) Date of Patent: May 28, 2002

(54) METHODS FOR THE REGENERATION OF A DENITRATION CATALYST

(75) Inventors: Shigeru Nojima; Kozo Iida; Yoshiaki Obayashi, all of Hiroshima (JP)

(73) Assignee: Mitsubishi Heavy Industries, Ltd. (JP)

( * ) Notice: Subject to any disclaimer, the term of this patent is extended or adjusted under 35 U.S.C. 154(b) by 0 days.

(21) Appl. No.: 09/263,709

(22) Filed: Mar. 5, 1999

(30) Foreign Application Priority Data

| Jul. 24, 1998 | (JP) | 10-209417 |
| Jul. 24, 1998 | (JP) | 10-209418 |

(51) Int. Cl.[7] .......................... B01J 38/64; B01J 38/66; B01J 38/60
(52) U.S. Cl. .............................. 502/25; 502/26; 502/27
(58) Field of Search .............................. 502/25, 26, 27

(56) References Cited

U.S. PATENT DOCUMENTS

| 4,615,991 A | * 10/1986 | Obayashi et al. ......... 423/239.1 |
| 4,656,147 A | * 4/1987 | Iida et al. ............... 423/239.1 |
| 5,151,256 A | * 9/1992 | Kato et al. .............. 423/239.1 |
| 6,025,292 A | * 2/2000 | Obayashi et al. ............. 502/27 |

FOREIGN PATENT DOCUMENTS

| EP | 0353467 A1 | 2/1990 |
| JP | 51-20794 | 2/1976 |
| JP | 51129889 A | 11/1976 |
| JP | 52027091 A | 3/1977 |
| JP | 52063891 A | 5/1977 |
| JP | 54010294 A | 1/1979 |
| JP | 55139841 A | 11/1980 |
| JP | 58000247 A | 1/1983 |
| JP | 60-34743 | * 2/1985 |
| JP | 60175550 A | 9/1985 |
| JP | 1080444 A | 3/1988 |
| JP | 63-146990 | * 6/1988 |
| JP | 01080444 A | 3/1989 |
| JP | 64-80444 | * 3/1989 |
| JP | 10-66872 | 3/1998 |
| JP | 10-235209 | * 9/1998 |

OTHER PUBLICATIONS

Official Action for corresponding Japanese Patent Application No. 209417/1998, dated Jul. 26, 1999.
Official Action for corresponding Japanese Patent Application No. 209418/1998, dated Jul. 26, 1999.
European Search Report, European Patent Application No. 99103952.0, Dated Mailed: Oct. 26, 1999.
Translation of EP 353,467, Feb. 1990.*
Translation of Japan 64–80444, Mar. 1989.*
Abstract of JP 61–153139. Jul. 1986.*

* cited by examiner

*Primary Examiner*—Steven Bos
(74) *Attorney, Agent, or Firm*—Myers Bigel Sibley & Sajovec (57) ABSTRACT

This invention provides a method for the regeneration of a denitration catalyst which comprises cleaning a denitration catalyst having reduced denitration power with an aqueous alkaline solution to remove the substances deposited thereon, and subjecting the catalyst to an activation treatment with an aqueous acid solution; a method for the regeneration of a denitration catalyst which comprises cleaning a denitration catalyst having reduced denitration power with a cleaning fluid comprising an aqueous solution containing sulfuric acid or ammonia at a concentration of 0.05 to 20% by weight and maintained at a temperature of 10 to 90°C.; and a method for the regeneration of a denitration catalyst which comprises cleaning a denitration catalyst having reduced denitration power under the above-described conditions, and impregnating the denitration catalyst with a catalytically active component so as to support it on the catalyst.

4 Claims, 1 Drawing Sheet

FIG.1

METHODS FOR THE REGENERATION OF A DENITRATION CATALYST

FIELD OF THE INVENTION AND RELATED ART STATEMENT

This invention relates to methods for the regeneration of a denitration catalyst. More particularly, it relates to methods for the regeneration of a denitration catalyst which makes it possible to regenerate a denitration catalyst having reduced denitration powder and considered to be hard to regenerate, and thereby utilize it again effectively.

Recently, in order to remove nitrogen oxides (hereinafter referred to as $NO_x$) produced in boilers and various combustion furnaces for the purpose of preventing air pollution, a catalytic ammonia reduction process wherein ammonia is used as a reducing agent and nitrogen oxides are decomposed to nitrogen and water by contact with a catalyst is being widely employed. Most of the $NO_x$ removal catalysts currently used for practical purposes are honeycomb-shaped catalysts which have through-holes of square cross section in order to prevent clogging with dust present in exhaust gas and increase the gas contact area.

With respect to catalyst components, titanium oxide is highly suitable for use as a principal component, and vanadium, tungsten and the like are commonly used as active components. Thus, $TiO_2\text{-}WO_3$ or $TiO_2\text{-}MoO_3$ binary catalysts and $TiO_2\text{-}V_2O_5\text{-}WO_3$ or $TiO_2\text{-}V_2O_5\text{-}MoO_3$ ternary catalysts are being popularly used. The catalytic power of these denitration catalysts tends to be gradually reduced with service time, and the cause for the reduction in catalytic power varies according to the type of the fuel used in the source of exhaust gas (e.g., boiler).

For example, in the case of exhaust gas from an oil-fired boiler, sodium contained in the dust present in exhaust gas is chiefly deposited on the catalyst and causes a reduction in catalytic power. In the case of exhaust gas from a coal-fired boiler, calcium contained in the dust present in exhaust gas is chiefly deposited on the catalyst surfaces and reacts with sulfuric anhydride present in the exhaust gas to form calcium sulfate. This calcium sulfate covers the catalyst surfaces and hinders NO and $NH_3$ gases from diffusing into the interior of the catalyst, resulting in reduced catalytic power.

It has conventionally been known that catalysts having reduced catalytic power attributable to these causes of deterioration can be effectively regenerated by cleaning them with water or an aqueous solution of hydrochloric acid.

In the course of experiments on the regeneration of catalysts having been used for exhaust gas from coal-fired boilers, the present inventors have recognized that the conventional cleaning method using water or an aqueous solution of hydrochloric acid exhibits is scarcely effective in regenerating the catalytic power of some catalysts. Upon examination of the cause therefor, it has been found that a high concentration of arsenic compound($As_2O_5$) is present on the surfaces of the catalysts for which cleaning with water or an aqueous solution of hydrochloric acid fails to exhibit a regenerative effect.

Generally, when a denitration catalyst is applied to exhaust gas produced by the combustion of a gaseous fuel, little reduction in catalytic power is observed.

However, for catalysts used in exhaust gas from coal-fired boilers in which coal of poor quality tends to be increasingly used in recent years, a marked reduction in catalytic power is observed in some cases. Examination of these deteriorated catalysts has revealed that a high concentration of arsenic is present on the catalyst surfaces as described above, and the conventional cleaning method using water or an aqueous solution of hydrochloric acid exhibits little regenerative effect on them. Moreover, in order to clarify the cause for the deposition of arsenic on the surfaces of a catalyst used for a coal-fired boiler, an investigation was made on the fuel used in the source of exhaust gas. As a result, it has been found that a high concentration of arsenic compounds are present in such coal. These arsenic compounds are converted into diarsenic trioxide ($As_2O_3$), which is carried by combustion gas and becomes adsorbed on the catalyst. Then, this diarsenic trioxide is oxidized on the catalyst according to the following reaction formula (1) and fixed to the catalyst in the form of stable diarsenic pentoxide ($As_2O_5$).

$$As_2O_3 + O_2 \rightarrow As_2O_5 \qquad (1)$$

For this reason, there has been a problem in that, when the substances responsible for the deterioration of the catalyst are arsenic compounds deposited on the catalyst surfaces, the conventional cleaning method using water or an aqueous solution of hydrochloric acid exhibits little regenerative effect on the catalyst.

OBJECTS AND SUMMARY OF THE INVENTION

In view of the above-described problem, the present inventors made intensive investigations in order to develop a method for the regeneration of a denitration catalyst which not only can regenerate a denitration catalyst having reduced catalytic power as a result of its long-time use, while avoiding the conventionally known reduction in catalytic power due to the deposition of sodium or calcium, but also can regenerate a denitration catalyst that could not be effectively regenerated by cleaning with water or an aqueous solution of hydrochloric acid because of the presence of arsenic on the catalyst surfaces.

As a result, the present inventors have now found that the above-described problem can be solved by treating a spent denitration catalyst according to a method which comprises an alkali treatment step for removing the arsenic compounds deposited on the catalyst surfaces, and a subsequent activation treatment step.

Moreover, the present inventors also have found that the above-described problem can be solved by cleaning a spent denitration catalyst with an aqueous solution of sulfuric acid or ammonia to convert the arsenic compounds deposited on the catalyst surfaces into water-soluble compounds and thereby remove them from the catalyst surfaces.

The present invention has been completed from this point of view.

According to a first embodiment of the present invention, there is provided a method for the regeneration of a denitration catalyst which comprises cleaning a denitration catalyst having reduced denitration power with an aqueous alkaline solution to remove the substances deposited thereon, and subjecting the catalyst to an activation treatment with an aqueous acid solution. In a preferred embodiment, the aforesaid aqueous alkaline solution is an aqueous solution of NaOH, KOH, $Na_2CO_3$, $NaHCO_3$ or $K_2CO_3$ and the aforesaid aqueous acid solution is an aqueous solution of HCl, $HNO_3$, HF or $H_2SO_4$.

According to a second embodiment of the present invention, there is provided a method for the regeneration of a denitration catalyst which comprises cleaning a denitration catalyst having reduced denitration power with a cleaning fluid comprising an aqueous solution containing sulfuric acid or ammonia at a concentration of 0.05 to 20% by weight and maintained at a temperature of 10 to 90° C. In this method, the hardly soluble arsenic compounds deposited on the catalyst surfaces can be more effectively removed by maintaining the temperature of the cleaning fluid in the range of 20 to 80° C.

According to a third embodiment of the present invention, there is provided a method for the regeneration of a denitration catalyst which comprises cleaning a denitration catalyst having reduced denitration power under any of the conditions described above, and impregnating the denitration catalyst with a catalytically active component so as to support it on the catalyst. In this method, the catalytically active component with which the catalyst is impregnated comprises, for example, vanadium or tungsten that is liable to be dissolved out.

Conventionally, catalysts having arsenic compounds deposited thereon have been incapable of regeneration and hence disposed of. However, the regeneration methods of the present invention make it possible to regenerate such catalysts and utilize them effectively again as denitration catalysts.

BRIEF DESCRIPTION OF THE DRAWING

The reference characters shown in FIG. 1 are defined as follows: 1, honeycomb-shaped denitration catalyst; L, length; and P, pitch.

DETAILED DESCRIPTION OF PREFERRED EMBODIMENTS

Embodiment 1

The present invention relates to the regeneration of a denitration catalyst which has been used for the removal of nitrogen oxides present in combustion exhaust gas and has reduced catalytic power due to the deposition of arsenic (As) compounds on the catalyst surfaces. According to the first embodiment thereof, the catalyst is regenerated by dissolving the arsenic compounds (principally $As_2O_5$) deposited on the catalyst surfaces. The denitration catalysts which can be regenerated according to the present invention are ones comprising titanium oxide as a principal component and containing vanadium, tungsten, molybdenum or the like as an active component. Specific examples thereof include $TiO_2$-$WO_3$ or $TiO_2$-$MoO_3$ binary catalysts, and $TiO_2$-$V_2O_5$-$WO_3$ or $TiO_2$-$V_2O_5$-$MoO_3$ ternary catalysts.

More specifically, the regeneration method of this embodiment comprises an alkali treatment step and a subsequent activation treatment step. If necessary, this regeneration method may further include a step for impregnating the denitration catalyst with a catalytically active component so as to support it on the catalyst.

First of all, in the alkali treatment step, a denitration catalyst having reduced catalytic power due to the deposition of arsenic compounds is cleaned with an aqueous alkaline solution to remove the arsenic compounds from the denitration catalyst. No particular limitation is placed on the cleaning method, for example, the cleaning method is carried out bringing the denitration catalyst into contact with a cleaning fluid comprising an aqueous solution of sulfuric acid or ammonia. Specific examples thereof include a method in which the denitration catalyst is soaked in an aqueous alkaline solution, a method in which the denitration catalyst is allowed to stand in an aqueous solution of sulfuric acid or ammonia, and a method in which, after the denitration catalyst is placed in an aqueous alkaline solution, air is bubbled through the solution or forced convection currents are produced in the solution to promote the renewal thereof.

In this alkali treatment step, an aqueous solution of a strongly basic compound is used as the aqueous alkaline solution. For this purpose, it is preferable to use a basic compound which can remove arsenic by forming a sodium or potassium compound thereof. More specifically, the aqueous alkaline solution used in the present invention may comprise, for example, an aqueous solution of NaOH, KOH, $Na_2CO_3$, $NaHCO_3$ or $K_2CO_3$.

When the aqueous alkaline solution comprises an aqueous solution of NaOH, KOH, $Na_2CO_3$, $NaHCO_3$ or $K_2CO_3$ as described above, it is usually effective that the alkali concentration in the aqueous alkaline solution is in the range of 0.05 to 20% by weight and the temperature of the aqueous alkaline solution serving as a cleaning fluid is in the range of 10 to 90° C. If the concentration of the aqueous alkaline solution is less than 0.05% by weight or the temperature of the cleaning fluid is lower than 10° C., a sufficient cleaning effect will not be obtained. On the other hand, if the concentration of the aqueous alkaline solution is greater than 20% by weight or the temperature of the cleaning fluid is higher than 90° C., the cost of the treating equipment may be considerably raised.

In the subsequent activation treatment step, the denitration catalyst having undergone the alkali treatment is subjected to an activation treatment with an aqueous acid solution.

Specifically, although the arsenic compounds can be removed by cleaning the denitration catalyst in the above-described alkali treatment step, the alkaline component remains on the catalyst and acts as a poison thereto. Since the alkali metal itself is a substance responsible for the deterioration of the denitration catalyst, this denitration catalyst, unless properly treated, may be deteriorated by the alkali metal, in spite of the fact that a reduction in catalytic power due to the deposition of arsenic compounds can be avoided.

Accordingly, in the present invention, the catalyst having undergone the alkali cleaning is subjected to an activation treatment with an aqueous acid solution so as to remove the alkali remaining on the catalyst. Thus, the denitration catalyst is freed of any catalyst poison.

In this activation treatment step, it is conceivable that an aqueous solution of an organic acid or an inorganic acid may be used as the aqueous acid solution. However, with consideration for the cost required for after-treatment and the like, it is preferable to use an aqueous acid solution prepared from an inorganic acid. Any of various inorganic acids capable of ion exchange with sodium or potassium may be used, whether they are strong acids or weak acids. More specifically, the aqueous acid solution used in the present invention may comprise, for example, an aqueous solution of HCl, $HNO_3$, HF or $H_2SO_4$.

When the aqueous acid solution comprises an aqueous solution of HCl, $HNO_3$, HF or $H_2SO_4$ as described above, it is usually effective that the concentration of the aqueous acid solution is in the range of 0.1 to 25% by weight and the temperature of the aqueous acid solution is in the range of 10 to 90° C. If the concentration of the aqueous acid solution is less than 0.1% by weight or the temperature of the aqueous acid solution is lower than 10° C., a sufficient degree of ion exchange may not be effected. On the other hand, if the concentration of the aqueous acid solution is greater than 25% by weight or the temperature of the aqueous acid solution is higher than 90° C., the cost of the treating equipment may be considerably raised.

In the present invention, if necessary, the denitration catalyst having undergone the above-described alkali treatment step and activation treatment step may further be regenerated by subjecting it to the following step for impregnating the denitration catalyst with a catalytically active component so as to support it on the catalyst.

When the catalyst is subjected to the above-described alkali cleaning and activation treatment with an acid, vanadium or tungsten forming a catalytically active component may be dissolved out from the catalyst, thus causing a reduction in denitration power due to a decreased active component concentration in the catalyst. Consequently, according to the present invention, after the catalyst is cleaned to remove arsenic compounds therefrom, washed with water and dried, the catalyst may be impregnated with vanadium or tungsten so that the active component is supported on the catalyst and the active component concentration in the catalyst is thereby adjusted to its level before regeneration.

In order to impregnate the catalyst with vanadium, the catalyst may be soaked in an aqueous solution prepared by dissolving a vanadium compound (e.g., vanadium pentoxide, ammonium metavanadate or vanadyl sulfate) in water, an organic acid, or an amine solution.

In order to impregnate the catalyst with tungsten, the catalyst may be soaked in an aqueous solution prepared by dissolving a tungsten compound (e.g., ammonium paratungstate, tungsten trioxide or tungsten chloride) in water, hydrochloric acid, an amine solution or an organic acid.

According to the above-described regeneration method of this embodiment, a spent catalyst is first subjected to an alkali treatment step for cleaning it with an aqueous alkaline solution, so that the arsenic compounds [principally diarsenic pentoxide ($As_2O_5$)] deposited on the catalyst are converted into easily soluble $Na_3AsO_4$ according to the following reaction formula (2). Thus, the arsenic compounds deposited on the catalyst surfaces can be removed. The following reaction formula represents the reaction taking place when NaOH is used for the aqueous alkaline solution.

$$As_2O_5 + 6NaOH \rightarrow 2Na_3AsO_4 + 3H_2O \qquad (2)$$

However, after this alkali treatment step, $Na^+$ ion remains on the catalyst.

Accordingly, in an activation treatment step subsequent to the above-described alkali treatment step, the Na+ ion remaining on the catalyst and acting as a catalyst poison is removed by ion exchange using an aqueous solution of an acid such as HCl, so that the $Na^+$ ion is replaced by $H^+$ ion. This makes it possible to remove $Na^+$ ion from the catalyst and thereby restore the activity of the denitration catalyst.

As described above, the cleaning effect for removing arsenic compounds is enhanced by the above-described alkali treatment and activation treatment with an acid, but an increased amount of vanadium or other element forming a catalytically active component may be dissolved out, resulting in a reduction in the active component concentration remaining in the catalyst. Thus, although arsenic compounds responsible for the reduced denitration power have been removed, it is apparently impossible to restore the denitration power. Accordingly, when a considerable amount of the active component is dissolved out from the catalyst under certain cleaning conditions, it is effective to restore the catalytic power suitably by impregnating the catalyst with vanadium or the like so as to support it on the catalyst.

Embodiment 2

The present invention relates to the regeneration of a denitration catalyst which has been used for the removal of nitrogen oxides present in combustion exhaust gas and has reduced catalytic power due to the deposition of As compounds on the catalyst surfaces. According to the second embodiment thereof, the catalyst is regenerated by cleaning the catalyst with an aqueous solution of sulfuric acid ($H_2SO_4$) or ammonia ($NH_3$) and thereby dissolving $As_2O_5$ deposited on the catalyst surfaces. The denitration catalysts which can be regenerated according to the present invention are ones comprising titanium oxide as a principal component and containing vanadium, tungsten, molybdenum or the like as an active component. Specific examples thereof include $TiO_2$-$WO_3$ or $TiO_2$-$MoO_3$ binary catalysts, and $TiO_2$-$V_2O_5$-$WO_3$ or $TiO_2$-$V_2O_5$-$MoO_3$ ternary catalysts.

In this embodiment, a denitration catalyst having reduced catalytic power is cleaned with a cleaning fluid comprising an aqueous solution containing sulfuric acid or ammonia at a concentration of 0.05 to 20% by weight and maintained at a temperature of 10 to 90° C. No particular limitation is placed on the cleaning method, and the purpose of cleaning is accomplished by bringing the denitration catalyst into contact with a cleaning fluid comprising an aqueous solution of sulfuric acid or ammonia. Specific examples thereof include a method in which the denitration catalyst is soaked in an aqueous alkaline solution, a method in which the denitration catalyst is allowed to stand in an aqueous solution of sulfuric acid or ammonia, and a method in which, after the denitration catalyst is placed in an aqueous alkaline solution, air is bubbled through the solution or forced convection currents are produced in the solution to promote the renewal thereof.

If the concentration of the aqueous solution of sulfuric acid or ammonia used for this cleaning purpose is unduly low, a sufficient regenerative effect will not be obtained. On the other hand, if its concentration is unduly high, a satisfactory regenerative effect is achieved, but part of the silica contained in the clay (e.g., acid clay or diatomaceous earth) and glass fibers (consisting chiefly of silica) which are added to the catalyst in an amount of several to ten-odd percent during its fabrication for the purpose of maintaining the strength of the catalyst is also dissolved. As a result, the strength of the catalyst may be reduced to a level lower than that required for use in actual plants. Accordingly, in order to obtain a regenerative effect while maintaining the strength of the catalyst, it is necessary to clean the catalyst with an aqueous solution containing sulfuric acid or ammonia at a concentration of 0.05 to 20% by weight.

Moreover, when the arsenic compounds deposited on the catalyst surfaces exist in hardly soluble form, a sufficient regenerative effect may not be obtained by using an aqueous solution of sulfuric acid or ammonia having a low temperature. In such a case, the hardly soluble arsenic compounds deposited on the catalyst surfaces can be removed by raising the temperature of the cleaning fluid (i.e., the aqueous solution of sulfuric acid or ammonia) to 10–90° C. and preferably 20–80° C.

However, when the temperature of the cleaning fluid (i.e., the aqueous solution of sulfuric acid or ammonia) becomes higher, vanadium or tungsten forming a catalytically active component may be dissolved out from the catalyst, thus causing a reduction in denitration power due to a decreased active component concentration in the catalyst.

Consequently, according to the present invention, after the catalyst is cleaned to remove arsenic compounds therefrom, washed with water and dried, the catalyst may be impregnated with vanadium or tungsten, if necessary, so that the active component is supported on the catalyst and the active component concentration in the catalyst is thereby adjusted to its level before regeneration.

In order to impregnate the catalyst with vanadium, the catalyst may be soaked in an aqueous solution prepared by dissolving a vanadium compound (e.g., vanadium pentoxide, ammonium metavanadate or vanadyl sulfate) in water, an organic acid, or an amine solution.

In order to impregnate the catalyst with tungsten, the catalyst may be soaked in an aqueous solution prepared by dissolving a tungsten compound (e.g., ammonium paratungstate, tungsten trioxide or tungsten chloride) in water, hydrochloric acid, an amine solution or an organic acid.

According to the above-described regeneration method of this embodiment, the arsenic compounds [principally diarsenic pentoxide ($As_2O_5$)] deposited on a catalyst can be removed by cleaning.

Specifically, when the catalyst is cleaned with an aqueous solution of sulfuric acid, the arsenic compounds are converted into arsenic acid ($Na_3AsO_4$) according to the following reaction formula (3), so that the dissolution thereof is promoted. Thus, the arsenic compounds deposited on the catalyst surfaces can be removed.

$$As_2O_5 + 3H_2O \rightarrow 2H_3AsO_4 \quad (3)$$

On the other hand, when the catalyst is cleaned with an aqueous solution of ammonia, the arsenic compounds are converted into water-soluble ammonium arsenate [$(NH_4)_3AsO_4$] according to the following reaction formula (4). Thus, the arsenic compounds deposited on the catalyst surfaces can be removed easily.

$$As_2O_5 + 6NH_3 + 6H_2O \rightarrow 2(NH_4)_3AsO_4 \cdot 3H_2O \quad (4)$$

Moreover, when hardly soluble arsenic compounds are deposited on the catalyst surfaces, it is effective to raise the temperature of the cleaning fluid and thereby enhance its cleaning effect. However, when the temperature of the cleaning fluid becomes higher, its cleaning effect is enhanced, but an increased amount of vanadium or other element forming a catalytically active component may be dissolved out, resulting in a reduction in the active component concentration remaining in the catalyst. Thus, although arsenic compounds responsible for the reduced denitration power have been removed, it is apparently impossible to restore the denitration power. Accordingly, when a considerable amount of the active component is dissolved out from the catalyst under certain cleaning conditions, it is effective to restore the catalytic power suitably by impregnating the catalyst with vanadium or the like so as to support it on the catalyst.

Conventionally, catalysts having arsenic compounds deposited thereon have been incapable of regeneration and hence disposed of. However, the above-described regeneration methods of the present invention make it possible to regenerate such catalysts and utilize them effectively again as denitration catalysts. Moreover, by regenerating and reusing such catalysts, the regeneration methods of the present invention contribute to a decrease in the amount of industrial waste, and hence have an important industrial significance from the viewpoint of environmental protection.

The present invention is more specifically explained with reference to the following examples. However, these examples are not to be construed to limit the scope of the invention.

Example 1

Figure 1:
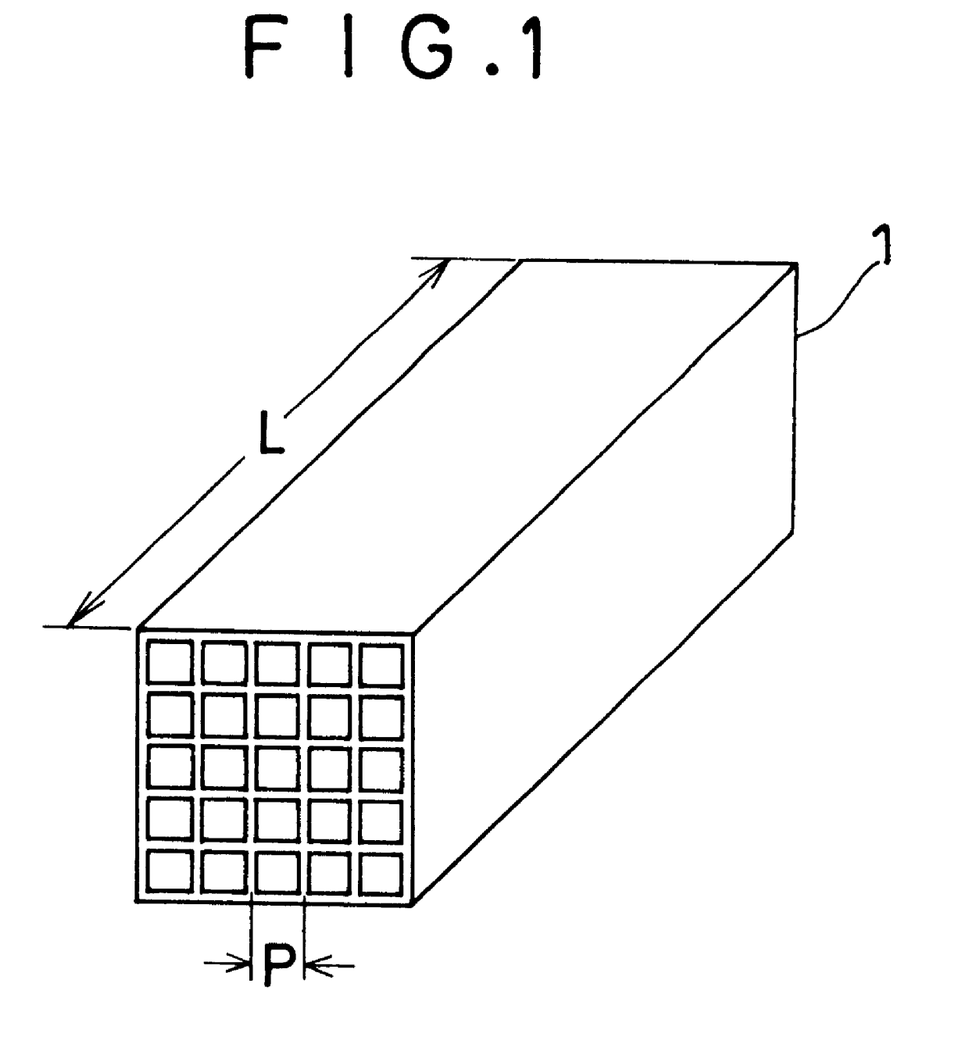
FIG. 1 is a perspective view of a honeycomb-shaped denitration catalyst used in the examples of the present invention which will be given later.

Denitration catalysts (composed of 89.2 wt. % of $TiO_2$, 10.2 wt. % of $WO_3$, and 0.6 wt. % of $V_2O_5$) having a honeycomb configuration with a pitch of 7.4 mm as shown in FIG. 1 were used in exhaust gas from a coal-fired boiler plant A for about 29,000 hours.

In order to regenerate five denitration catalysts having reduced denitration power as a result of the aforesaid use, each of them was soaked in a cleaning fluid comprising a 1 wt. % aqueous solution of NaOH, KOH, $Na_2CO_3$, $NaHCO_3$ or $K_2CO_3$ so that the volume ratio of the cleaning fluid to the denitration catalyst was 4.0, allowed to stand at 40° C. for 4 hours, washed with water, and then dried.

After the above-described alkali cleaning, the catalyst was soaked in an activating fluid comprising a 1% aqueous solution of $H_2SO_4$ so that the volume ratio of the activating fluid to the catalyst was 4.0, allowed to stand at 40° C. for 1 hour, washed with water, and then dried. As shown in Table 2 below, the regenerated catalysts thus obtained are referred to as "Catalysts 1–5".

Three other catalysts were treated in the same manner as described above for Catalyst 1, except that, in place of a 1% aqueous solution of $H_2SO_4$, a 1% aqueous solution of HCl, $HNO_3$ or HF was used as the activating fluid. Specifically, each of them was soaked in the activating fluid so that the volume ratio of the activating fluid to the catalyst was 4.0, allowed to stand at 40° C. for 1 hour, washed with water, and then dried. As shown in Table 2 below, the regenerated catalysts thus obtained are referred to as "Catalysts 6–8".

Comparative Example 1

In order to regenerate two denitration catalysts having been used in the same manner as in Example 1, each of them was soaked in a cleaning fluid comprising water or a 1% aqueous solution of HCl so that the volume ratio of the cleaning fluid to the catalyst was 4.0, allowed to stand at 20° C. for 4 hours, washed with water, and then dried. The catalyst treated with water is referred to as "Catalyst 51" and the catalyst treated with an aqueous solution of HCl as "Catalyst 61".

Moreover, another denitration catalyst was treated in the same manner as described for Catalyst 1 in Example 1, except that the activation treatment with an aqueous solution of $H_2SO_4$ was omitted. Specifically, the catalyst was cleaned with a cleaning fluid comprising an aqueous solution of NaOH, washed directly with water, and then dried to obtain "Catalyst 71".

Example 2

Denitration catalysts (composed of 89.2 wt. % of $TiO_2$, 10.2 wt. % of $WO_3$, and 0.6 wt. % of $V_2O_5$) having a honeycomb configuration with a pitch of 7.4 mm were used in a coal-fired boiler plant B for about 55,000 hours.

In order to regenerate twelve denitration catalysts having reduced denitration power as a result of the aforesaid use, each of them was soaked in a cleaning fluid comprising a 5% aqueous solution of NaOH, KOH or $Na_2CO_3$ so that the volume ratio of the cleaning fluid to the denitration catalyst was 4.0, allowed to stand at 60° C. for 4 hours, washed with water, and then dried.

After the above-described alkali cleaning, the catalyst was soaked in an activating fluid comprising a 5 wt. % aqueous solution of HCl, $HNO_3$, $H_2SO_4$ or HF so that the volume ratio of the activating fluid to the catalyst was 4.0, allowed to stand at 40° C. for 30 minutes, washed with water, and then dried. As shown in Table 3 below, the regenerated catalysts thus obtained are referred to as "Catalysts 9–20".

Moreover, these Catalysts 9–20 s were soaked in a solution prepared by dissolving vanadium pentoxide in an aqueous solution of oxalic acid, so that the vanadium concentration in the catalysts was adjusted to its level before cleaning. The regenerated catalysts thus obtained are referred to as "Catalysts 21–32".

Comparative Example 2

In order to regenerate two denitration catalysts having been used in the same manner as in Example 2, each of them was soaked in a cleaning fluid comprising water or a 1% aqueous solution of HCl so that the volume ratio of the cleaning fluid to the denitration catalyst was 4.0, allowed to stand at 20° C. for 4 hours, washed with water, and then dried. The catalyst treated with water is referred to as "Catalyst 52" and the catalyst treated with an aqueous solution of HCl as "Catalyst 62".

Moreover, this Catalyst 62 was soaked in a solution prepared by dissolving vanadium pentoxide in an aqueous solution of oxalic acid, so that the vanadium concentration in the catalyst was adjusted to its level before cleaning. The regenerated catalyst thus obtained is referred to as "Catalyst 63".

Moreover, another denitration catalyst was treated in the same manner as described for Catalyst 9 in Example 2, except that the activation treatment with an aqueous solution of HCl was omitted. Specifically, the catalyst was cleaned with a cleaning fluid comprising an aqueous solution of NaOH, washed directly with water, and then dried to obtain "Catalyst 72". Furthermore, this Catalyst 72 was soaked in a solution prepared by dissolving vanadium pentoxide in an aqueous solution of oxalic acid, so that the vanadium concentration in the catalyst was adjusted to its level before cleaning. The catalyst thus obtained is referred to as "Catalyst 73".

Example 3

The unused catalysts and spent catalysts for coal-fired boiler plants A and B, the regenerated catalysts obtained in Examples 1 and 2, and the regenerated catalysts obtained in Comparative Examples 1 and 2 were comparatively tested for denitration power under the conditions shown in Table 1.

Moreover, with respect to each of the regenerated catalysts, its average arsenic content and its compressive strength were also measured.

The results thus obtained are shown in Tables 2 and 3. In Tables 2 and 3, the degree of denitration (%) and the compressive strength ratio are defined as follows.

Degree of denitration (%)={[(Inlet $NO_x$ content)−(Outlet $NO_x$ content)]/(Inlet $NO_x$ content)}×100

Compressive strength ratio=(Compressive strength of test sample)/(Compressive strength of unused catalyst)

TABLE 1

| Test sample Item | Catalyst for coal-fired boilers |
|---|---|
| Shape of catalyst | 46 mm × 53 mm × 800 mm(L) |
| Flow rate of gas | 20.2 $Nm^3/m^2$ · hr |
| SV | 10,400 $h^{-1}$ |
| $NH_3/Nox$ | 1.0 |
| Temperature of gas | 380° C. |
| Composition of gas | NOx = 150 ppm |
|  | $NH_3$ = 150 ppm |
|  | SOx = 800 ppm |
|  | $O_2$ = 4% |
|  | $CO_2$ = 12% |
|  | $H_2O$ = 1.1% |
|  | $N_2$ = Balance |

(Notes)
SV: Superficial velocity ($hr^{-1}$), i.e., the ratio of the flow rate of gas to the amount of catalyst
$NH_3$/Nox: Molar ratio

TABLE 2

| Plant | Example and Comparative Example | | Cleaning fluid | Activating fluid | Catalyst | Degree of denitration (%) | Amount of $As_2O_5$ (wt. %) | Amount of $Na_2O$ or $K_2O$ (wt. %) |
|---|---|---|---|---|---|---|---|---|
| A (coal-fired) | Example 1 | | NaOH | $H_2SO_4$ | 1 | 79.1 | 0.3 | <0.1 |
| | | | KOH | $H_2SO_4$ | 2 | 78.3 | 0.4 | <0.1 |
| | | | $Na_2CO_3$ | $H_2SO_4$ | 3 | 77.6 | 0.2 | <0.1 |
| | | | $NaHCO_3$ | $H_2SO_4$ | 4 | 79.3 | 0.3 | <0.1 |
| | | | $K_2CO_3$ | $H_2SO_4$ | 5 | 80.0 | 0.5 | <0.1 |
| | | | NaOH | HCl | 6 | 80.1 | 0.3 | <0.1 |
| | | | NaOH | $HNO_3$ | 7 | 79.6 | 0.3 | <0.1 |
| | | | NaOH | HF | 8 | 77.4 | 0.2 | <0.1 |
| | Comparative Example 1 | | Water | — | 51 | 53.3 | 2.8 | 0 |
| | | | HCl | — | 61 | 54.2 | 2.7 | 0 |
| | | | NaOH | — | 71 | 46.0 | 0.3 | 2.4 |
| | Reference Example 3 | | Spent catalyst | | | 51.0 | 3.2 | 0 |
| | Reference Example 4 | | Unused catalyst | | | 80.7 | 0 | 0 |

TABLE 3

| Plant | Example and Comparative Example | | | Catalyst | Degree of denitration (%) | V$_2$O$_5$ (wt. %) | Amount of As$_2$O$_5$ (wt. %) | Amount of Na$_2$O or K$_2$O (wt. %) |
|---|---|---|---|---|---|---|---|---|
| | | Cleaning fluid | Activating fluid | | | | | |
| B (coal-fired) | Example 2 | 5% NaOH | 5% HCl | 9 | 73.2 | 0.35 | 0.1 | <0.1 |
| | | | | 21 | 79.8 | 0.6 | | |
| | | | 5% HNO$_3$ | 10 | 72.8 | 0.32 | 0.1 | <0.1 |
| | | | | 22 | 80.2 | 0.6 | | |
| | | | 5% H$_2$SO$_4$ | 11 | 74.1 | 0.30 | 0.1 | <0.1 |
| | | | | 23 | 80.4 | 0.6 | | |
| | | | 5% HF | 12 | 73.8 | 0.25 | 0.15 | <0.1 |
| | | | | 24 | 80.6 | 0.6 | | |
| | | 5% KOH | 5% HCl | 13 | 74.1 | 0.35 | 0.1 | <0.1 |
| | | | | 25 | 80.2 | 0.6 | | |
| | | | 5% HNO$_3$ | 14 | 72.4 | 0.30 | 0.15 | <0.1 |
| | | | | 26 | 79.7 | 0.6 | | |
| | | | 5% H$_2$SO$_4$ | 15 | 71.5 | 0.25 | 0.1 | <0.1 |
| | | | | 27 | 79.4 | 0.6 | | |
| | | | 5% HF | 16 | 73.2 | 0.35 | 0.15 | <0.1 |
| | | | | 28 | 78.6 | 0.6 | | |
| | | 5% Na$_2$CO$_3$ | 5% HCl | 17 | 70.2 | 0.25 | 0.1 | <0.1 |
| | | | | 29 | 79.1 | 0.6 | | |
| | | | 5% HNO$_3$ | 18 | 71.2 | 0.25 | 0.15 | <0.1 |
| | | | | 30 | 80.1 | 0.6 | | |
| | | | 5% H$_2$SO$_4$ | 19 | 70.4 | 0.30 | 0.1 | <0.1 |
| | | | | 31 | 80.3 | 0.6 | | |
| | | | 5% HF | 20 | 73.2 | 0.30 | 0.15 | <0.1 |
| | | | | 32 | 80.5 | 0.6 | | |
| | Comparative Example 2 | Water | — | 52 | 50.1 | 0.6 | 3.6 | <0.1 |
| | | 5% HCl | — | 62 | 53.1 | 0.5 | 3.3 | <0.1 |
| | | | | 63 | 56.1 | 0.6 | | |
| | | 5% NaOH | — | 72 | 41.2 | 0.4 | 0.1 | 2.2 |
| | | | | 73 | 45.8 | 0.6 | | |
| | Reference Example 1 | Spent catalyst | | | 48 | 0.6 | 4.2 | 0 |
| | Reference Example 2 | Unused catalyst | | | 80.7 | 0.6 | 0 | 0 |

It has been confirmed by these results that, when a catalyst having reduced denitration power due to the deposition of arsenic compounds on the catalyst surfaces is regenerated by cleaning it with an aqueous alkaline solution and then subjecting it to an activation treatment with an aqueous acid solution, most of the arsenic compounds and alkaline substances acting as catalyst poisons can be removed and, therefore, the catalyst can be regenerated to the fullest extent.

Moreover, as shown in Example 2, it may happen that vanadium forming a catalytically active component is dissolved out during alkali cleaning and activation treatment, thus causing a reduction in catalytic power. However, it has been found that, in such a case, the catalytic power can be fully restored (or regenerated) by dissolving and removing arsenic compounds from the catalyst and then impregnating the catalyst with vanadium so as to make up for the loss.

Example 4

Denitration catalysts (composed of 89.2 wt. % of TiO$_2$, 10.2 wt. % of WO$_3$, and 0.6 wt. % of V$_2$O$_5$) having a honeycomb configuration with a pitch of 7.4 mm as shown in FIG. 1 were used in exhaust gas from a coal-fired boiler plant A for about 23,000 hours.

In order to regenerate six denitration catalysts having reduced denitration power as a result of the aforesaid use, each of them was soaked in a cleaning fluid comprising an aqueous solution containing H$_2$SO$_4$ at a concentration of 0.03%, 0.05%, 0.3%, 1%, 20% or 30% so that the volume ratio of the cleaning fluid to the denitration catalyst was 4.0, allowed to stand at 20° C. for 4 hours, washed with water, and then dried.

The regenerated catalysts thus obtained are referred to as "Catalysts 101–106" in order of increasing sulfuric acid concentration.

Moreover, in order to regenerate five other denitration catalysts having reduced denitration power as a result of the aforesaid use, each of them was soaked in a cleaning fluid comprising an aqueous solution containing NH$_3$ at a concentration of 0.03%, 0.05%, 1%, 20% or 30% so that the volume ratio of the cleaning fluid to the denitration catalyst was 4.0, allowed to stand at 20° C. for 4 hours, washed with water, and then dried.

The regenerated catalysts thus obtained are referred to as "Catalysts 107–111" in order of increasing ammonia concentration.

Comparative Example 3

In order to regenerate two denitration catalysts having been used in the same manner as in Example 4, each of them was soaked in a cleaning fluid comprising water or a 1% aqueous solution of HCl so that the volume ratio of the cleaning fluid to the catalyst was 4.0, allowed to stand at 20° C. for 4 hours, washed with water, and then dried.

The catalyst treated with water is referred to as "Catalyst 151" and the catalyst treated with an aqueous solution of HCl as "Catalyst 161".

Example 5

Denitration catalysts (composed of 89.2 wt. % of TiO$_2$, 10.2 wt. % of WO$_3$, and 0.6 wt. % of V$_2$O$_5$) having a honeycomb configuration with a pitch of 7.4 mm were used in a coal-fired boiler plant B for about 45,000 hours.

In order to regenerate twelve denitration catalysts having reduced denitration power as a result of the aforesaid use, each of them was soaked in a cleaning fluid comprising an aqueous solution containing H$_2$SO$_4$ at a concentration of 0.3%, 1% or 20% so that the volume ratio of the cleaning fluid to the denitration catalyst was 4.0, allowed to stand for 4 hours while maintaining the temperature of the cleaning fluid at 10, 20, 80 or 90° C., washed with water, and then dried. As shown in Table 5 below, the regenerated catalysts thus obtained are referred to as "Catalysts 122–123".

Moreover, these Catalysts 122–123 were soaked in a solution prepared by dissolving vanadium pentoxide in an aqueous solution of oxalic acid, so that the vanadium concentration in the catalysts was adjusted to its level before cleaning. As shown in Table 5 below, the regenerated catalysts thus obtained are referred to as "Catalysts 124–135".

On the other hand, in order to regenerate four denitration catalysts having reduced denitration power as a result of the aforesaid use, each of them was soaked in a cleaning fluid comprising an aqueous solution containing $HNO_3$ at a concentration of 1.0% so that the volume ratio of the cleaning fluid to the denitration catalyst was 4.0, allowed to stand for 4 hours while maintaining the temperature of the cleaning fluid at 10, 20, 80 or 90° C., washed with water, and then dried. The regenerated catalysts thus obtained are referred to as "Catalysts 136–139" in order of increasing temperature of the cleaning fluid.

Moreover, these Catalysts 136–139 were soaked in a solution prepared by dissolving vanadium pentoxide in an aqueous solution of oxalic acid, so that the vanadium concentration in the catalysts was adjusted to its level before cleaning. The regenerated catalysts thus obtained are referred to as "Catalysts 140–144".

Comparative Example 4

In order to regenerate two denitration catalysts having been used in the same manner as in Example 5, each of them was soaked in a cleaning fluid comprising water or a 1% aqueous solution of HCl so that the volume ratio of the cleaning fluid to the denitration catalyst was 4.0, allowed to stand at 20° C. for 4 hours, washed with water, and then dried. The catalyst treated with water is referred to as "Catalyst 152" and the catalyst treated with an aqueous solution of HCl as "Catalyst 162".

Moreover, this Catalyst 162 was soaked in a solution prepared by dissolving vanadium pentoxide in an aqueous solution of oxalic acid, so that the vanadium concentration in the catalyst was adjusted to its level before cleaning. The regenerated catalyst thus obtained is referred to as "Catalyst 163".

Example 6

The unused catalysts and spent catalysts for coal-fired boiler plants A and B, the regenerated catalysts obtained in Examples 4 and 5, and the regenerated catalysts obtained in Comparative Examples 3 and 4 were comparatively tested for denitration power under the conditions shown in the above Table 1.

Moreover, with respect to each of the regenerated catalysts obtained in Examples 4 and 5, its average arsenic content and its compressive strength were also measured.

The results thus obtained are shown in Tables 4 and 5. In Tables 4 and 5, the degree of denitration (%) and the compressive strength ratio are defined as follows.

Degree of denitration (%)={[(Inlet $NO_x$ content)−(Outlet $NO_x$ content)]/(Inlet $NO_x$ content)}×100 Compressive strength ratio=(Compressive strength of test sample)/(Compressive strength of unused catalyst)

TABLE 4

| Plant | Example and Comparative Example | Catalyst | Degree of denitration (%) | Compressive strength ratio | Amount of $As_2O_5$ (wt. %) |
|---|---|---|---|---|---|
| A (coal-fired) | Example 4 | | | | |
| | 0.03% $H_2SO_4$ | 101 | 71.6 | 1.02 | 1.8 |
| | 0.05% $H_2SO_4$ | 102 | 79.5 | 1.04 | 1.0 |
| | 0.3% $H_2SO_4$ | 103 | 80.7 | 1.00 | 0.4 |
| | 1% $H_2SO_4$ | 104 | 80.8 | 0.95 | 0.3 |
| | 20% $H_2SO_4$ | 105 | 80.9 | 0.93 | 0.2 |
| | 30% $H_2SO_4$ | 106 | 80.7 | 0.60 | 0.1 |
| | 0.03% $NH_3$ | 107 | 71.3 | 1.01 | 2.0 |
| | 0.05% $NH_3$ | 108 | 78.3 | 1.04 | 0.9 |
| | 1% $NH_3$ | 109 | 79.8 | 1.00 | 0.3 |
| | 20% $NH_3$ | 110 | 80.3 | 0.96 | 0.2 |
| | 30% $NH_3$ | 111 | 80.5 | 0.65 | 0.1 |
| | Comparative Example 3 | 151 | 68.5 | — | 2.7 |
| | | 161 | 69.0 | — | 2.4 |
| | Reference Example 5 | Spent catalyst | 62.0 | 1.05 | 3.0 |
| | Reference Example 6 | Unused catalyst | 80.7 | 1.00 | 0 |

TABLE 5

| Plant | Example and Comparative Example | Cleaning conditions | | Catalyst | Degree of denitration (%) | Compressive strength ratio | Amount of $As_2O_5$ (wt. %) |
|---|---|---|---|---|---|---|---|
| | | Cleaning fluid | Temperature (° C.) | | | | |
| B (coal-fired) | Example 5 | 0.3% $H_2SO_4$ | 10 | 112 | 66.8 | — | 2.0 |
| | | | | 124 | 73.8 | 1.00 | |
| | | | 20 | 113 | 70.3 | — | 1.2 |
| | | | | 125 | 80.5 | 0.98 | |
| | | | 80 | 114 | 70.9 | — | 0.8 |
| | | | | 126 | 80.8 | 0.97 | |
| | | | 90 | 115 | 71.2 | — | 0.6 |
| | | | | 127 | 81.1 | 0.92 | |
| | | 1.0% $H_2SO_4$ | 10 | 116 | 67.1 | — | 1.0 |
| | | | | 128 | 76.5 | 0.98 | |
| | | | 20 | 117 | 69.0 | — | 0.6 |
| | | | | 129 | 81.5 | 0.96 | |
| | | | 80 | 118 | 68.7 | — | 0.4 |

TABLE 5-continued

| Plant | Example and Comparative Example | Cleaning fluid | Temperature (° C.) | Catalyst | Degree of denitration (%) | Compressive strength ratio | Amount of As$_2$O$_5$ (wt. %) |
|---|---|---|---|---|---|---|---|
| | | | | 130 | 81.0 | 0.97 | |
| | | | 90 | 119 | 66.3 | — | 0.3 |
| | | | | 131 | 81.2 | 0.85 | |
| | | 20% H$_2$SO$_4$ | 10 | 120 | 67.4 | — | 0.8 |
| | | | | 132 | 77.1 | 0.95 | |
| | | | 20 | 121 | 69.0 | — | 0.5 |
| | | | | 133 | 81.3 | 0.95 | |
| | | | 80 | 122 | 69.5 | — | 0.3 |
| | | | | 134 | 81.5 | 0.94 | |
| | | | 90 | 123 | 64.3 | — | 0.2 |
| | | | | 135 | 81.0 | 0.8 | |
| | | 1.0% H$_2$SO$_4$ | 10 | 136 | 68.0 | — | 1.0 |
| | | | | 140 | 76.5 | 0.99 | |
| | | | 20 | 137 | 70.5 | — | 0.7 |
| | | | | 141 | 77.5 | 0.96 | |
| | | | 80 | 138 | 71.5 | — | 0.5 |
| | | | | 142 | 79.0 | 0.93 | |
| | | | 90 | 139 | 72.1 | — | 0.2 |
| | | | | 143 | 80.0 | 0.80 | |
| | Comparative Example 4 | Water | 20 | 152 | 66.4 | — | 4.6 |
| | | 1.0% HCl | 20 | 162 | 67.6 | — | 4.4 |
| | | | 20 | 163 | 70.4 | — | 4.2 |
| | Reference Example 7 | | Spent catalyst | | 66.8 | 1.09 | 5.0 |
| | Reference Example 8 | | Unused catalyst | | 80.7 | 1.00 | 0 |

It can be seen from these results that, when a catalyst having reduced denitration power due to the deposition of arsenic compounds on the catalyst surfaces is regenerated with the aid of a cleaning fluid, its arsenic-removing effect is insufficient if the sulfuric acid or ammonia concentration in the cleaning fluid is less than 0.03% by weight. On the other hand, the denitration power is restored at a sulfuric acid or ammonia concentration of 30% by weight or greater, but part of the silica contained in the clay and glass fibers added to the catalyst during its fabrication for the purpose of maintaining the strength of the catalyst is also dissolved to cause a reduction in strength.

Accordingly, the sulfuric acid or ammonia concentration of the cleaning fluid must be greater than 0.03% by weight and less than 30% by weight.

Moreover, it can be seen from the results of Example 5 that, when the arsenic compounds deposited on the catalyst surfaces are hardly soluble ones, they are not easily dissolved if the cleaning fluid has a temperature of 10° C. or so, and a sufficient regenerative effect cannot be obtained. In such a case, it is preferable to heat the cleaning fluid to 20° C. or above. However, if the temperature of the cleaning fluid reaches 90° C., the strength of the honeycomb-shaped catalyst is reduced. Accordingly, the temperature of the cleaning fluid should desirably be in the range of 20 to 80° C.

Furthermore, when the cleaning fluid has a temperature of 20° C. or above, it may happen that vanadium forming a catalytically active component is dissolved out during cleaning, thus causing a reduction in catalytic power. However, it has been found that, in such a case, the catalytic power can be fully restored (or regenerated) by dissolving and removing arsenic compounds from the catalyst and then impregnating the catalyst with vanadium so as to make up for the loss.

What is claimed is:

1. A method for the regeneration of an arsenic-poisened denitration catalyst which comprises:

immersing a honeycomb-shaped denitration having reduced denitration power due to poisoning by arsenic compounds in exhaust gas from coal-fired boilers in a cleaning fluid comprising an aqueous solution containing sulfuric acid or ammonia at a concentration of 0.05 to 20% by weight and maintained at a temperature of 20 to 80° C.; and then washing the denitration catalyst with water.

2. A method for the regeneration of a denitration catalyst which comprises cleaning a denitration catalyst having reduced denitration power under the conditions described in claim 1, and impregnating the denitration catalyst with a catalytically active component so as to support the catalytically active component on the catalyst.

3. A method for the regeneration of an arsenic-poisened denitration catalyst which comprises:

cleaning a honeycomb-shaped denitration having reduced denitration power due to poisoning by arsenic compounds in exhaust gas from coal-fired burners in a cleaning fluid comprising an alkali at a concentration of 0.05 to 20 percent by weight and maintained at a temperature of 10 to 90° C. to remove arsenic compounds that are substances deposited on the catalyst, and subjecting the catalyst to an activated treatment with aqueous acid solution.

4. A method for the regeneration of a denitration catalyst as claimed in claim 3 wherein said aqueous alkaline solution is an aqueous solution of NaOH, KOH, Na$_2$CO$_3$, NaHCO$_3$ or K$_2$CO$_3$ and said aqueous acid solution is an aqueous solution of HCl, HNO$_3$, HF or H$_2$SO$_4$.

* * * * *

UNITED STATES PATENT AND TRADEMARK OFFICE
CERTIFICATE OF CORRECTION

PATENT NO. : 6,395,665 B2
DATED : May 28, 2002
INVENTOR(S) : Nojima et al.

It is certified that error appears in the above-identified patent and that said Letters Patent is hereby corrected as shown below:

<u>Column 16,</u>
Line 30, should read as follows: --1.   A method for the regeneration of an arsenic-poisoned --
Line 32, should read as follows: -- immersing a honeycomb-shaped denitration catalyst having --
Line 46, should read as follows: --3.   A method for the regeneration of an arsenic-poisoned --
Line 48, should read as follows: -- cleaning a honeycomb-shaped denitration catalyst having reduced --
Line 50, should read as follows: -- pounds in exhaust gas from coal-fired burners with a --
Line 51, should read as follows: -- cleaning fluid containing an alkali at a concentration of --

Signed and Sealed this

Third Day of June, 2003

JAMES E. ROGAN
*Director of the United States Patent and Trademark Office*